US011501449B2

(12) United States Patent
Behrendt et al.

(10) Patent No.: US 11,501,449 B2
(45) Date of Patent: Nov. 15, 2022

(54) METHOD FOR THE ASSESSMENT OF POSSIBLE TRAJECTORIES

(71) Applicant: Robert Bosch GmbH, Stuttgart (DE)

(72) Inventors: Karsten Behrendt, Sunnyvale, CA (US); Jan Kleindieck, Ludwigsburg (DE); Jason Scott Hardy, Union City, CA (US)

(73) Assignee: Robert Bosch GmbH, Stuttgart (DE)

( * ) Notice: Subject to any disclaimer, the term of this patent is extended or adjusted under 35 U.S.C. 154(b) by 27 days.

(21) Appl. No.: 16/920,045

(22) Filed: Jul. 2, 2020

(65) Prior Publication Data

US 2021/0004966 A1  Jan. 7, 2021

(30) Foreign Application Priority Data

Jul. 3, 2019  (DE) ..................... 10 2019 209 736.7

(51) Int. Cl.
*G06K 9/00* (2022.01)
*G06T 7/246* (2017.01)
(52) U.S. Cl.
CPC .... *G06T 7/246* (2017.01); *G06T 2207/20081* (2013.01); *G06T 2207/20084* (2013.01); *G06T 2207/30236* (2013.01); *G06T 2207/30241* (2013.01); *G06T 2207/30248* (2013.01)
(58) Field of Classification Search
CPC ........... G06T 7/246; G06T 2207/20081; G06T 2207/20084; G06T 2207/30236; G06T 2207/30241; G06T 2207/30248
USPC ......................................................... 382/104
See application file for complete search history.

(56) References Cited

U.S. PATENT DOCUMENTS

| 9,098,753 | B1* | 8/2015 | Zhu ................... G06K 9/00805 |
| 10,108,863 | B2* | 10/2018 | Miller ..................... G06T 7/246 |
| 10,963,705 | B2* | 3/2021 | Huang ................. G08G 1/0129 |
| 2017/0364083 | A1 | 12/2017 | Yang et al. |
| 2019/0164422 | A1* | 5/2019 | Bai .................. G08G 1/096725 |
| 2021/0001897 | A1* | 1/2021 | Chai ........................ G06N 3/08 |

(Continued)

FOREIGN PATENT DOCUMENTS

| DE | 10 2016 215 314 A1 | 2/2018 |
| DE | 10 2017 216 202 A1 | 3/2019 |
| DE | 10 2018 218 895 A1 | 5/2019 |

OTHER PUBLICATIONS

Felsen, Panna, Patrick Lucey, and Sujoy Ganguly. "Where will they go? predicting fine-grained adversarial multi-agent motion using conditional variational autoencoders." Proceedings of the European Conference on Computer Vision (ECCV). 2018. (Year: 2018).*

(Continued)

*Primary Examiner* — Jonathan S Lee
(74) *Attorney, Agent, or Firm* — Maginot, Moore & Beck LLP (57) ABSTRACT

A method for assessing possible trajectories of road users in a traffic environment includes capturing the traffic environment with static and dynamic features, identifying at least one traffic user, determining at least one possible trajectory for at least one road user in the traffic environment, and assessing the at least one determined possible trajectory for the at least one road user with an adapted/trained recommendation service and the captured traffic environment.

16 Claims, 3 Drawing Sheets

(56) References Cited

U.S. PATENT DOCUMENTS

2021/0064890 A1* 3/2021 Murveit .............. G05D 1/0088
2021/0201504 A1* 7/2021 Xu ...................... G06N 3/0445

OTHER PUBLICATIONS

Roddick, Thomas, Alex Kendall, and Roberto Cipolla. "Orthographic feature transform for monocular 3d object detection." arXiv preprint arXiv:1811.08188 (2018). (Year: 2018).*

Zhao, Tianyang, et al. "Multi-agent tensor fusion for contextual trajectory prediction." Proceedings of the IEEE/CVF Conference on Computer Vision and Pattern Recognition. 2019. (Year: 2019).*

Güting, Ralf Hartmut, Thomas Behr, and Jianqiu Xu. "Efficient k-nearest neighbor search on moving object trajectories." The VLDB Journal 19.5 (2010): 687-714. (Year: 2010).*

* cited by examiner

METHOD FOR THE ASSESSMENT OF POSSIBLE TRAJECTORIES

This application claims priority under 35 U.S.C. § 119 to patent application no. DE 10 2019 209 736.7, filed on Jul. 3, 2019 in Germany, the disclosure of which is incorporated herein by reference in its entirety.

The disclosure relates to a method for assessing possible trajectories of road users in a traffic situation

BACKGROUND

An assessment of the trajectory options of other road users is essential for reliable trajectory planning of an at least partially automated vehicle in real traffic situations. For example, if another vehicle enters a common lane, a vehicle that is at least partially automated may have to reduce speed. If a pedestrian wants to cross the road in front of the automated vehicle, it may have to come to a complete standstill.

Known classification models have a fixed number of classes. These classes each constitute a specific trajectory for a road user for a type of crossing and are highly specialized in this one case. For example, a general problem is simplified into a fixed set of options, wherein heuristics are used or machine learning techniques are used to calculate a specific trajectory.

SUMMARY

One problem with the solutions indicated in the prior art is that not all options of possible traffic situations are covered, which can lead to overly cautious or, on the other hand, overly dangerous planning. The large number of possible real-world scenarios cannot be described with variants of types of environment defined in advance.

With too many different classes of trajectories, trajectory planning systems based on class classification quickly reach functional limits due to the large number of possibilities. This applies in particular where the classes are difficult to distinguish and may not be properly annotated.

This is because agents influence each other, including the actions of the automated ego-vehicle. This leads to a combinatorial explosion of possible alternatives and the generation of a set of rules of all possible solutions is beyond practical possibilities.

Also to create heuristics, i.e. a set of learned rules which are applied in certain situations and can be location-dependent or scenario-dependent, can quickly be unachievable with the number of different locations and scenarios.

When using state-of-the-art machine learning approaches to estimate agent trajectories, i.e. trajectories of road users, these trajectories are generated, for example, by reinforcement learning, reinforcement learning, recurring neural networks, or imitation learning.

One problem with this approach is that the trained model must receive and understand all the necessary inputs and must then be able to output one or a plurality of different trajectories or intentions that comply with traffic law. However, this large number of calculated trajectories is then difficult to process further without assessing the individual trajectories. The results thus produced by the machine learning system are not sufficiently reliable and are difficult to validate.

When simplifying the approach of estimation of trajectories by determining a limited set of possible classes raises the problem that not all options are covered, which may result in planning that is too cautious or dangerous. This is because the planning system must obtain as many options as possible from the other agents and must be able to weight them in accordance with their probability and impact in order to be able to plan comfortable and safe trajectories.

According to the disclosure, a method, an apparatus and a computer program product and a computer-readable storage medium are specified for the assessment of possible trajectories of road users of a traffic environment according to the features of the independent claims, which at least partially have the aforementioned effects. Advantageous embodiments are the subject matter of the dependent claims and the following description.

The disclosure is based on the finding that an assessment of a probability that trajectories of a particular traffic environment, which are possible from a traffic technology point of view and according to traffic law, are driven by a road user, and thus constitute observed trajectories, may be carried out by means of a recommendation service in a particularly suitable manner.

In that regard, such an assessment must be taken as a recommendation of a trajectory to the traffic environment which is using the recommendation service, so to speak, and the road user is part of the traffic environment.

The basic assumption of a recommendation service is that similar users behave similarly. The assessment of the users is implicitly derived from the use of the trajectories and a metric.

A user assessment implicitly results regarding the future behavior of the users by comparing the possible trajectories with the actual observed trajectory. This will be repeated multiple millions of times over an extended period for a large number of traffic environments. One advantage of this method is that multiple almost equally probable assessments are possible without it leading to ambiguities, for example in that a method of another type predicts an averaging of two trajectories which is unfavorable and can lead to an impossible trajectory.

According to one aspect of the method for assessing possible trajectories of road users of a traffic environment, in one step the traffic environment is captured with static and dynamic features.

In a further step of the method, at least one road user is identified. In particular, this identification can be carried out by using the captured dynamic features of the traffic situation.

In particular, a road user can be identified by using the captured dynamic features of the traffic situation.

In a further step of the method, at least one possible trajectory is determined for at least one road user in the traffic situation.

In a further step of the method, the determined at least one possible trajectory for the at least one road user is assessed by means of an adapted recommendation service and the captured traffic environment.

The possible trajectories of road users are the trajectories that the respective road user may travel in compliance with the traffic rules. In particular, however, it may also be the trajectories that are possible for the respective road user to travel. The environment will be specified relative to the respective road user. For example, the environment may be specified centered around the road user.

A recommendation service is a method that aims to make a prediction and to quantify how great is a user's interest in an object, in order to recommend to the user exactly the objects from the set of all existing objects in which he is most likely to be interested.

Collaborative recommendation services, also known as collaborative filters, recommend the objects in which users with similar assessment behaviors, i.e. similar users, have the greatest interest. In order to do this, there is no need for further knowledge about the object itself. Such a collaborative recommendation service is therefore able to accurately recommend complex objects without the need for an "understanding" of the object itself.

A recommendation service assesses objects based on given information about the current usage based on previously considered user-object combinations based on metrics.

Collaborative filtering systems have many forms, but many common systems can be reduced to two steps:

Searching for users that share the same assessment patterns with the active user, that is the user for whom the prediction is being determined.

Using the assessments of the users found in the search to calculate a prediction for the active user.

This falls under the category of user-based collaborative filtering. A specific application is the user-defined K-nearest neighbor algorithm.

One advantage of this method for assessing possible trajectories of transport components is that it is not subject to any restriction in relation to the traffic environment. No rules or heuristics need to be explicitly developed. Such an assessment of possible trajectories can be done quickly, almost in real time.

Static and dynamic features of the traffic environment can relate to details of static and dynamic objects, but these features, for example as a whole, can also relate to the entire object itself.

The identification of a road user can be carried out by means of the captured dynamic features of the traffic situation.

The captured traffic environment, with static and dynamic features, means the capture of the features at a specific time at which the information is available to carry out this method.

An adapted recommendation service is a recommendation service that has been set up and tested in relation to its structure, i.e. the type or nature of the recommendation service, and in relation to its specific design, for example by training a neural network or by establishing a K-nearest neighbor method by means of training data or training vectors and similar, to perform the specific task. Example structures or the adaptation of such a recommendation service will be described in more detail.

According to one aspect, it is proposed that the traffic environment has the following dynamic and static features or objects of a traffic situation: speeds, speed differences, mutual distances between road users, distances of the road users from the environment, plan views of road users and traffic situations, directions of motion or orientations of road users relative to the environment.

Furthermore, the traffic environment comprises the following dynamic and static features or objects of a traffic situation: traffic rules, in particular locally relevant traffic rules, stop lines, stop lines, traffic lines, lane markings.

In addition, the traffic environment has the following dynamic and static features or objects of a traffic situation: traffic light status, geographical map data, lanes, structures of intersections, junctions and traffic routes in general; and additionally summarized descriptions of a traffic environment such as: traffic situations in general, traffic flow, traffic jam, clear road.

Road users refers not only to vehicles in the general sense, but also to all road users, especially pedestrians, with their position, orientation, and speed.

According to one aspect, it is proposed that at least one feature of the traffic environment is captured by means of a sensor.

These can be static or dynamic features, which can also be used to capture temporary features or temporal processes.

According to one aspect, it is proposed that the traffic environment be captured by determining at least one dynamic feature at two or more consecutive times.

If there is successive information for the description of the traffic environment in each individual assessment step, the accuracy of the method can be significantly increased.

According to one aspect, it is proposed that features of the traffic environment should comprise at least one traffic rule and/or at least one feature of at least one traffic light system and/or at least one static or dynamic road sign.

This additional information describes the traffic environment in more detail and thus allows a better assessment of the possible trajectories.

According to one aspect, it is proposed that at least one feature of the traffic environment is captured by means of an imaging sensor.

Such an imaging sensor allows at least parts of the traffic environment to be identified and classified very precisely, which in turn can have a positive effect on the accuracy of the assessment.

According to one aspect, it is proposed that at least one feature of the traffic environment is captured by means of a sensor of an ego-vehicle. Advantageously, this type of capture of the traffic environment is focused on a particularly relevant part, in relation to the ego-vehicle.

According to one aspect, it is proposed that at least one feature of the traffic environment is captured by means of a stationary sensor. For example, such a sensor, at busy or complex-structured intersections, may transmit data to, for example, an ego-vehicle, which enable the ego-vehicle to improve the assessment of possible trajectories, in particular of other road users.

According to one aspect, it is proposed that at least one dynamic feature of the traffic environment is captured by means of a sensor. Compared to other options for capturing dynamic features, such a sensor can increase reliability. For example, a radar sensor can directly determine the speed of a road user. But dynamic features or objects can also be derived from specific image processing of imaging sensors, for example.

According to one aspect, it is proposed that at least some of the static features and/or the dynamic features of the traffic situation of at least one road user will be transmitted wirelessly to another road user in the traffic situation.

This allows major traffic situations to be surveyed by the interaction of multiple road users, and, for example, a traffic environment or traffic situations that are difficult to see to be made available to some road users.

According to one aspect, it is proposed that the recommendation service would be adapted to assess possible trajectories using a large number of corresponding combinations of assessed observed trajectories, different traffic environments, and at least one possible trajectory.

This means that the recommendation service can be built up on the basis of observed trajectories linked to the appropriate traffic environments in order to adapt the recommendation system. Observed trajectories are trajectories that have been travelled in the real world in a specific traffic environment and can be represented and recorded in many ways.

According to one aspect, it is proposed that the recommendation service is a collaborative recommendation service and has a neural network with at least one convolution layer or has a recursive neural network or is based on a K-nearest neighbor method.

According to one aspect, it is proposed that the neural network has a first autoencoder for capturing the environment and has a second autoencoder for capturing the possible trajectories.

By dividing the neural network in the manner described, the training can be made easier.

An "autoencoder" is understood to be an artificial neural network that allows certain patterns contained in the input data to be learned. Autoencoders are used to generate a compressed or noise-free representation of the input data by suitably extracting the essential features, such as certain classes, from the general background.

The autoencoder uses three or more layers:

An input layer, such as a 2-dimensional image.

Multiple significantly smaller layers that form the encoding for reducing the data.

An output layer, the dimension of which corresponds to the input layer, i.e. each output parameter in the output layer has the same significance as the corresponding parameter in the input layer.

Alternatively, the traffic environment and the possible trajectories can also be entered directly into a neural convolutional network (CNN: convolutional neural net) to obtain an assessment.

According to another aspect, it is proposed that the vectors of the K-nearest neighbor method are formed with a variety of corresponding combinations of captured traffic environment and observed trajectory.

The K-nearest neighbor method provides a parameter-free and easy-to-implement approach to assessing new objects based on previously explicitly assessed and stored objects.

According to one aspect, it is proposed that at least one static feature of the traffic environment is captured by means of a geographical map. This is a simple method for capturing traffic-relevant static features. With highly accurate geographical maps, the method can be improved further.

According to one aspect, it is proposed that the traffic environment will be captured by transforming spatial parts of the traffic environment into a two-dimensional reference system, corresponding to a plan view of the traffic environment.

A plan view or a top view is a graphically represented, two-dimensional orthogonal projection of a spatial situation. In contrast to a bird's eye view, the plan view is a planar representation from which the dimensions of the object can be measured.

According to one aspect, it is proposed that the captured traffic environment includes a previous trajectory of at least one road user.

According to another aspect, it is proposed that at least one dynamic feature of the traffic environment of at least one road user will be captured in its previous course for a sufficiently long period of time to enable a further course of the trajectory to be estimated therefrom.

According to one aspect, it is proposed that the captured traffic environment includes the speed of at least one road user.

According to one aspect, it is proposed that the captured traffic environment includes the direction of movement of at least one road user.

According to one aspect, it is proposed that at least one possible trajectory is determined by an optimization of cost functions and/or by means of a search-based method and/or a machine-learning method.

By means of this variety of methods for determining the possible trajectories, the method can be adapted to local conditions.

The determination of possible trajectories can be carried out by heuristics for lane-keeping, for speed control and according to the course of the road. For example, a possible trajectory is determined for all possible lanes, which are supplemented with other trajectories, which take into account different traffic light circuits.

Standard methods can generate possible trajectories based on optimization of cost functions, can be search-based, or can use machine learning. The calculation of a trajectory by optimization creates a trajectory iteratively or directly which has very small deviations from the best possible features, such as driving comfort, distance from road users and complying with traffic rules. Search-based methods, in simple terms, seek to iteratively generate a best trajectory for their current environment by searching for a connection from A to B. Machine learning methods can learn to imitate already seen trajectories and generate new trajectories based thereon.

Alternative trajectory calculation functions are, for example, optimization-based and look for a trajectory which minimizes a given cost function; map-based methods simply only follow the lanes, for example; deep learning methods such as "imitation learning", "reinforcement learning" generate a trajectory by means of machine learning; physics-based methods determine trajectories based on the dynamics of the vehicle and are mainly used for short approximations.

In particular, a trajectory depicts a location of an object against time, can but also alternatively or additionally be represented as an indication of a speed against time and/or an acceleration against time.

When determining trajectories, all possibilities of change of direction, corresponding to the lanes and merging of lanes, are taken into account.

In particular, a possible trajectory for each road user can be determined by means of an accurate map of the respective environment including intersections, junctions, the road layout, and/or the current traffic regulations.

According to one aspect, it is proposed that at least one possible trajectory is determined taking into account driving comfort on the trajectory and/or a distance from other road users and/or compliance with traffic rules.

In particular, in the case of at least partly automated vehicles which use the described method to determine the ego-trajectory to be driven, for example, this serves to improve safety in the traffic situation or traffic environment.

According to one aspect, it is proposed that at least one possible trajectory is determined by means of a map representation of the traffic environment. In this case, all options for changing the direction of travel, corresponding to the lanes and merging of the lanes, as well as intersections, and current traffic regulations are to be taken into account.

According to one aspect, a method for the generation of a recommendation service for the assessment of possible trajectories is proposed.

In one step, a large number of corresponding combinations of the captured traffic environment, observed trajectory and at least one possible trajectory is determined for a large number of different traffic environments by repeating the following steps: In one step, the traffic environment is captured with at least one static feature and at least one dynamic feature.

In a further step, at least one road user in the traffic situation is identified.

In a further step, an observed trajectory of the at least one road user is captured.

In a further step, at least one possible trajectory for the at least one road user in the traffic environment is determined.

Then, the recommendation service with the large number of corresponding combinations of the captured traffic environment, the observed trajectory and the at least one possible trajectory is adapted by using a deviation of the observed trajectory from the at least one possible trajectory.

Sensor data for capturing the traffic environment can be captured using fused sensor data.

According to one aspect, it is proposed that for the assessment of an observed trajectory-traffic environment combination in a captured traffic environment, a difference of a possible trajectory of a transport road user from an observed trajectory is calculated using a metric. Due to the result of applying the metric to the deviation of an observed trajectory from a possible trajectory, the trajectory used can be described quantitatively and stored for further calculation.

For the training data, all trajectories are explicitly assessed using a metric. The recommendation service will then seek to implicitly minimize this metric, corresponding to a similarity metric, by means of the assessments.

For example, a system determines a series of possible trajectories based on the current road map. All possible changes of direction based on existing lanes and possible merging of lanes are calculated. Thereafter, a series of features of the traffic environment, for example relative distances, speeds, number of road users, their relationships, traffic rules, stop lines, traffic routes, plan views of road users, etc., is used as input for a recommendation service for estimating the probability of the possible trajectories.

Offline, i.e. without the influence of an active prediction system, the possible trajectories and observed trajectories of all road users are compared. The individual possible trajectories can be assessed by using differences between lane position, speed deviations, etc. for multiple time steps.

These assessments are used to train a machine learning system to
a) estimate the assessment of an intention as a regression problem,
b) compare the probability of two possible trajectories by classifying the possible trajectory with a higher probability, and
c) specify estimated probabilities for each possible trajectory.

This trained or adapted recommendation system, also referred to as a rating estimator, is then used online to estimate probabilities of the different intentions.

According to one aspect, it is proposed that the metric for calculating the difference of a possible trajectory of a road user from an observed trajectory determines a distance from waypoints on the respective trajectories.

According to a further aspect, it is proposed that the metric is the absolute difference from points on the respective trajectories at three different times, wherein a possible trajectory is calculated and added to the observed trajectory after a time when the traffic environment is captured. For example, the three different times can be 1, 2 or 3 seconds after determining the possible trajectory and can result from balancing cost and benefits.

According to another aspect, it is proposed that the metric is a function of a difference of waypoints and/or speeds and/or accelerations at waypoints on the respective trajectories.

In particular, the difference can be calculated in terms of location, speed, and acceleration at three times.

Such a relationship may be described with the following formula:

$$M(t_k, t) = \sum_{T}^{t1, t2, t3} (v(t_k, T) - v(t, T))^2 + (x(t_k, T) - x(t, T))^2 + (a(t_k, T) - a(t, T))^2$$

where $M(t_k, t)$ represents the metric of trajectory $t_k$ with:
$t_k$=possible trajectories; t=observed trajectories
$v(t_k, T)$ is the speed on the trajectory $t_k$ at time T: (t1,t2,t3);
$x(t_k, T)$ is the location on the trajectory $t_k$ at time T: (t1,t2,t3);
$a(t_k, T)$ is the acceleration on the trajectory $t_k$ at time T: (t1,t2, t3).

The variable t_k represents the kth trajectory, t represents the observed trajectory, t1, t2, t3 represent three time steps, v represents the speed, x represents the location and a represents the acceleration.

According to one aspect, it is proposed that the recommendation service is a collaborative recommendation service.

According to one aspect, it is proposed that the adaptation or training of the recommendation system is done offline.

According to one aspect, it is proposed that the recommendation service should assess the at least one possible trajectory using a neural network which is trained using a large number of assessed observed trajectory-traffic environment combinations of road users.

This makes it possible for the trained neural network to directly provide a scalar as a measure for assessing possible trajectories at its output.

A neural network provides a framework for many different algorithms for machine learning, for collaboration, and for processing complex data inputs. Such neural networks learn to perform tasks using examples, typically without being programmed with task-specific rules.

Such a neural network is based on a collection of connected units or nodes referred to as artificial neurons. Each connection can transmit a signal from one artificial neuron to another. An artificial neuron that receives a signal can process it and may then forward a modified signal.

In conventional implementations of neural networks, the signal on a connection of artificial neurons is a real number, and the output of an artificial neuron is calculated by a nonlinear function of the sum of its inputs. The connections of artificial neurons typically have a weighting that adjusts as learning progresses. The weighting increases or decreases the strength of the signal on a connection. Artificial neurons can have a threshold, so that a signal is only emitted when the entire signal exceeds that threshold. Typically, a large number of artificial neurons are combined in layers. Different layers may perform different types of transformations for their inputs. Signals migrate from the first layer, the input layer, to the last layer, the output layer, possibly after passing through the layers multiple times.

The architecture of an artificial neural feed-forward network can be an architecture which is configured to receive a single data pattern at its input stage, for example corresponding to an image, and which provides an output value, for example a classification vector or a scalar, which, according to the problem, contains an approximation based on previous training. Feed-forward networks pass through each neuron exactly once.

A multi-layer perceptron (MLP) belongs to the feed-forward artificial neural network family. In principle, MLPs consist of at least 3 layers of neurons: an input layer, an intermediate layer (hidden layer) and an output layer. This means that all neurons of the network are divided into layers, wherein a neuron of a given layer always receives its inputs only from a single previous layer and also forwards its outputs only to a fixed layer. Accordingly, there are no connections which skip a layer, or which are activated multiple times. Apart from the input layer, the different layers consist of neurons which are generally subjected to a nonlinear activation function and which are connected to the neurons of the next layer.

A recurrent neural network (RNN) is a neural network which, unlike the feed-forward networks, also has connections from neurons of one layer to neurons of the same or a previous layer. This structure is particularly suitable for discovering time-coded information in the data.

In addition to the feed-forward neural network implementations above, there is the construction of an artificial neural convolutional network from one or more convolutional layers, possibly followed by a pooling layer. The sequence of layers can be used with or without normalization layers (for example batch normalization), zero-padding layers, dropout layers and activation functions, such as rectified linear unit ReLU, sigmoid function, tanh function or softmax function.

In principle, these units can be repeated as often as desired, wherein in the case of sufficient repetitions deep convolutional neural networks are then referred to. After some repetitive blocks consisting of convolutional and pooling layers, the CNN can be terminated with one (or more) fully-connected layers, similar to the architecture of the MLP.

For the K-nearest neighbor method, vectors with the information from the environment capture, a map for autonomous driving and information about a possible trajectory are stored in a vector space during the adaptation or training.

The vector space is spanned by the length of the input vector, for example with 80 entries for environmental capture and 20 for trajectory, the vector space would span $R^{100}$. R represents the real numbers here and can be reduced depending on the dimension of the individual entries, for example to the natural numbers for discrete values or binary inputs.

For assessing a new environment capture-trajectory combination, represented by a vector, the new vector is compared with the existing vectors using a metric, for example the Euclidean norm. The existing "k"-nearest vectors are added to the assessment.

The rating is assessed as the weighted sum of the ratings of the K-nearest neighbors. For example, the same weightings or weightings selected inverse to the distance can be used as weightings.

This means that the capture of the traffic environment, including static information from map material, will be compressed to a vector by means of an autoencoder. In addition, directly calculated measures of the environment, for example traffic light status, right-of-way rules, speed limits, are stored in a separate vector. The autoencoder provides a vector of size 256, the measure vector size is 64.

In addition, the trajectory is represented by means of a vector compressed by an autoencoder and a measure vector. The sizes of the vectors are 64 and 24, respectively.

The combined vector of the environment capture and the trajectory consists of 408 entries and spans a vector space of this size.

For each vector entry there is an assessment for the training time based on the similarity of the trajectory actually driven and the possible, predicted trajectory.

At the inference time, for online assessment, the assessments of the 3 nearest neighbors of the predicated trajectory are arithmetically averaged for a given environment.

For runtime optimization, the spanned vector space can be compressed by means of a main component analysis and then partitioned by means of "trees" so that the next entries can be found more quickly.

For the recommendation service, features of the traffic environment with associated observed trajectories are transformed into a feature space and stored. For example, by a K-nearest neighbor method, the most probable trajectories are determined on the basis of distances in the feature space. This does not take the next class, but the class whose features are closest to the current trajectory.

According to one aspect, it is proposed that the assessment of possible trajectories is carried out repeatedly, for example cyclically. This will enable reactions to changes in the traffic situation.

For example, new assessments are performed whenever one of the asynchronously determined traffic environments has been calculated.

A method for planning a trajectory to be driven by at least one of the road users in a traffic environment is proposed, wherein at least one possible trajectory for each road user in the traffic environment is determined in one step.

In a further step, at least one of a plurality of each possible trajectory for each road user is assessed in accordance with the method described above. For example, a possible trajectory per reachable lane and a plurality of extra scenarios.

In a further step, the trajectory to be driven of the at least one road user in the traffic situation is determined using all the assessed, possible trajectories of the other road users.

According to one aspect, it is proposed that the assessments of possible trajectories are transferred to a trajectory planning system. This then allows the trajectory planning system to plan a trajectory to be driven.

According to one aspect, it is proposed that depending on the assessment of the trajectory of at least one of the vehicles, its ego-trajectory is calculated based on all the information that is available.

The described method can be used for behavioral planning, trajectory planning, motion planning, as well as an emergency braking assistant or as a driver assistance system.

From the assessments of the possible trajectories, probabilities can be calculated and planning of an ego-trajectory to be driven can then be carried out with the possible trajectories identified in this way.

A system for proposing an ego-trajectory to be driven is proposed, which is set up to perform the method in accordance with the method described above and, depending on the assessment of the trajectories of the other road users, proposes a trajectory to be driven to one of the road users. The trajectory to be driven is the trajectory that the road user wants to use to reach his destination.

An apparatus is proposed which is set up to perform the method described above.

A computer program is proposed that includes commands which, when the program is executed by a computer, cause it to perform the method described above.

A machine-readable storage medium is proposed on which the computer program described is stored.

BRIEF DESCRIPTION OF THE DRAWINGS

Exemplary embodiments of the disclosure are shown in FIGS. 1 to 3 and are explained in more detail below. In the figures.

DETAILED DESCRIPTION

Figure 1:
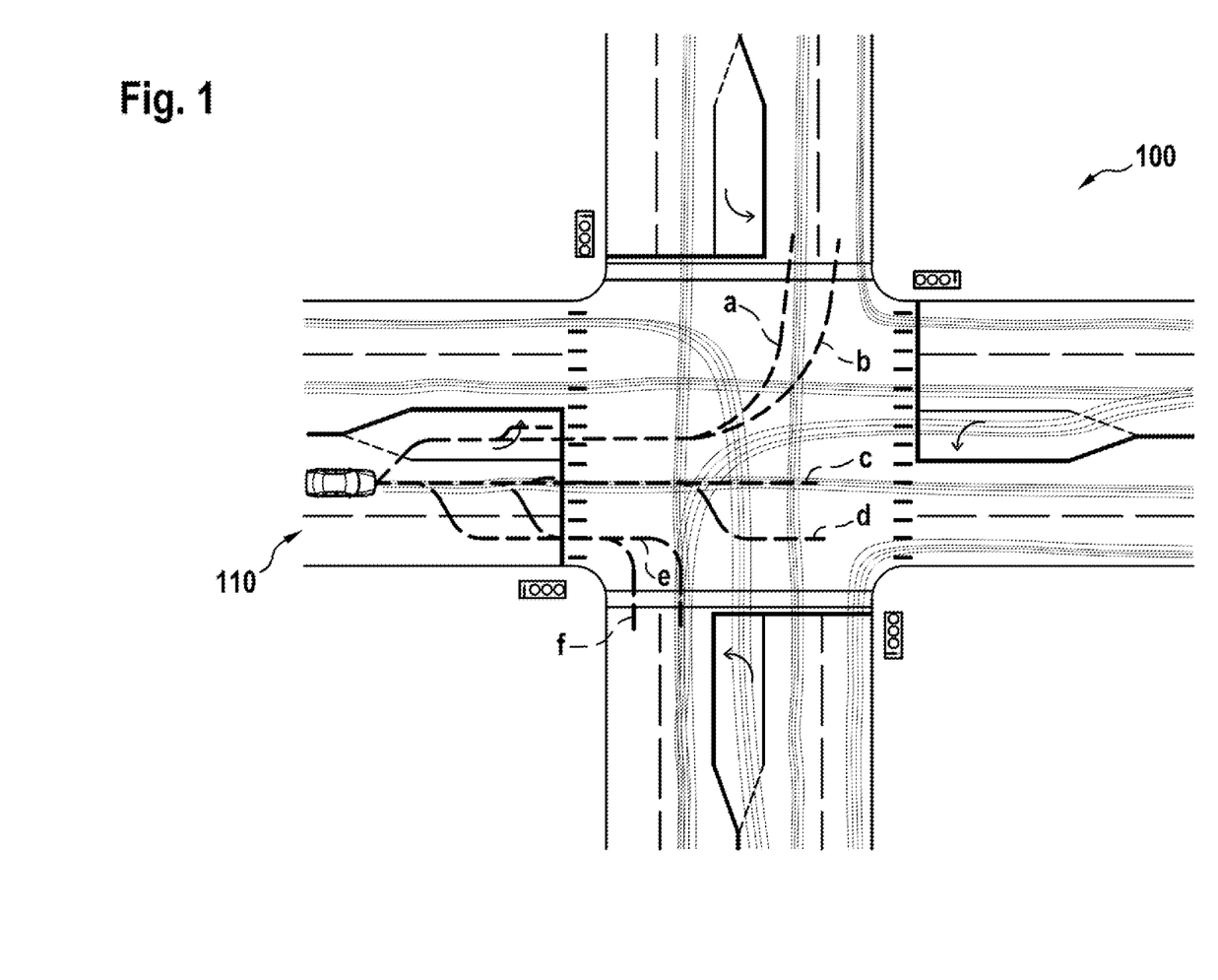
FIG. 1 shows an intersection with possible trajectories for a road user.

In FIG. 1, a traffic environment 100 is outlined in the form of a plan view of a multi-lane intersection. A road user 110 is sketched, as well as a variety of possible trajectories for the road user 110 marked with dashed lines a to f Multiple trajectories for at least one lane can also be taken into account. Previously noted road users are only indicated by thin lines of their observed trajectories.

Figure 2:
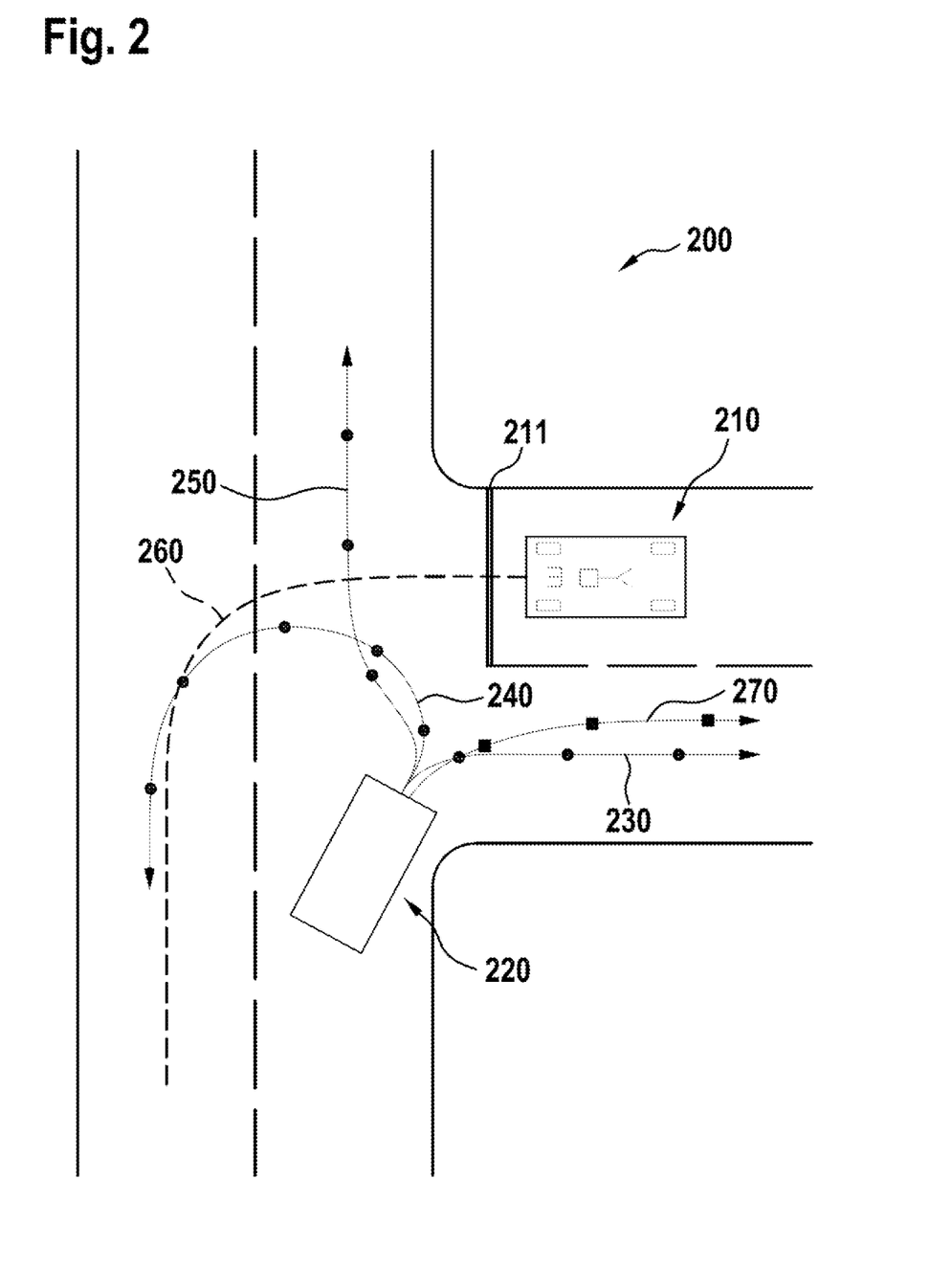
FIG. 2 shows a junction with two road users and possible trajectories.
Figure 3:
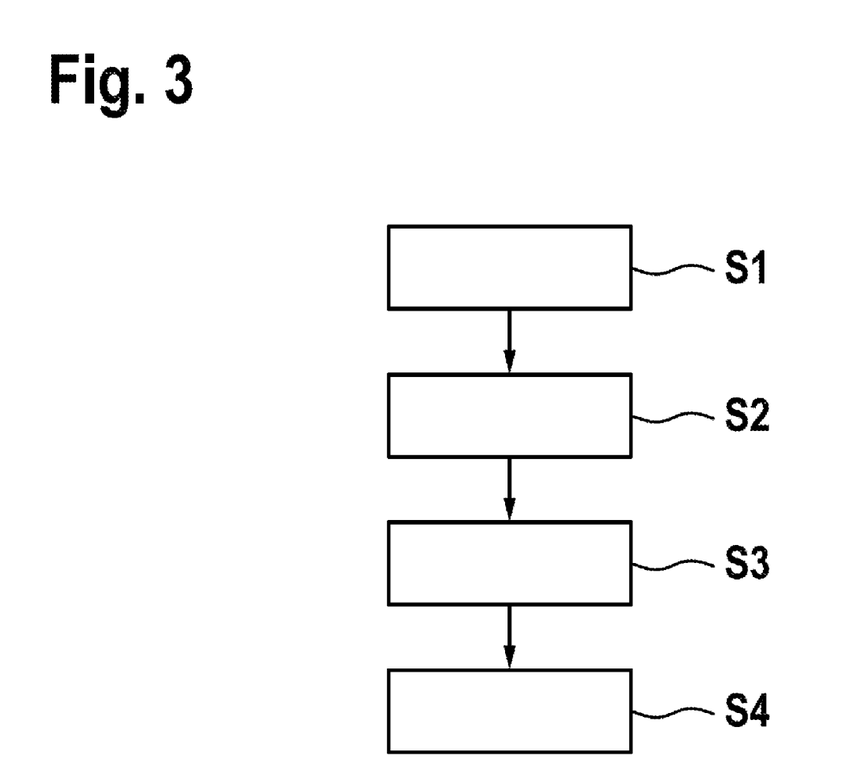
FIG. 3 shows the steps of the method for assessing possible trajectories.

FIG. 2 outlines another traffic environment 200 in a plan view of a T-junction or a junction with an ego-vehicle 210, which is not entitled to drive on, in front of a stop line 211. From the point of view of the ego-vehicle 210, a road user 220 is coming from the left, whose vehicle 2 is at a slight angle to the straight ahead direction on the priority road. In the situation of the road user 220, there are three options for continuing to drive on and a possible trajectory is marked for each option. For turning into the side road the trajectory is 230, for continuing straight ahead the trajectory is 250 and for turning round on the priority road the trajectory is 240. All possible changes of direction are calculated based on the lanes present and possible merges. In addition, the trajectory to be driven of the ego-vehicle 210, which is planning to turn left onto the priority road, is marked. The times t1, t2, t3 are indicated on the possible trajectories 230, 240, 250 of the road user 220 by black dots.

In addition, the observed trajectory 270 of the road user 220 is shown and the times t1, t2, t3 are indicated with small squares on the observed trajectory 270 to describe steps of the adaptation of the recommendation service.

In accordance with the method for assessing possible trajectories of road users in a traffic environment, in one step the traffic environment 200 is captured with the static features of the T-junction using a geographical map, for example a plan view, and the dynamic features of the ego-vehicle 210 and the road user 220. A series of features, for example relative distances of the vehicles 210, 220: barely a vehicle's length, the number of road users: here it is two, the spatial position thereof relative to each other: here it is almost transverse to each other, traffic rules: here a road with priority, and the stop line as the inputs for the recommendation service for the assessment of all possible trajectories 230, 240, 250.

In a further step, a road user 220 is identified by means of the captured dynamic features of the traffic situation 200, for example. In a further step, the possible trajectories 230, 240, 250 are determined for the at least one road user 220 of the traffic situation 200. In a further step, the possible trajectories 230, 240, 250 for the at least one road user 220 of the traffic environment 200 are assessed by a recommendation service. During this, the possible trajectories 230, 240, 250 were determined in particular while taking into account driving comfort on the trajectory and compliance with traffic rules, as can be seen from FIG. 2.

The recommendation service assesses the possible trajectories 230, 240, 250 using a variety of assessed observed trajectory-traffic environment combinations of road users, as described above.

If the road user 220 has continued his journey, the observed trajectory 270 marked in FIG. 2 may be determined to obtain further trajectory-traffic environment combinations for training the recommendation service.

The observed trajectory 270 can be assessed using a metric with the possible trajectories 230, 240, 250 by determining the waypoints on the respective trajectories at three times and measuring the distance between these waypoints of the observed trajectory 270 and the respective possible trajectory 230, 240, 250. The sum of these values gives a measure of the assessment according to formula 1.

The recommendation service used has an adapted, in particular trained neural network, wherein the recommendation service assesses the at least one possible trajectory using a neural network trained with the large number of assessed observed trajectory-traffic environment combinations of road users. The neural network has a first autoencoder for capturing the environment and a second autoencoder for capturing the possible trajectories.

The outputs of the environment capture are used as inputs for an autoencoder which is used to represent the current traffic situation around the ego-vehicle and the road users.

The outputs of the environment capture are partly transformed into a plan view by means of 3D transformations and accordingly represented in 2D as image planes. These image planes are then compressed by convolution planes as part of an autoencoder.

In addition, information such as traffic rules, distances between road users, speeds, traffic light states, and other difficult-to-visualize properties are added as vectors to a rear layer of the autoencoder.

The possible trajectories are also handled using 3D projections as 2D visualizations including map material in a separate autoencoder and supplemented by an additional information vector for the possible trajectory.

The outputs of the two autoencoders are then combined and routed into a system of multiple layers to dense layers and normalization layers. The output of this system is the scalar assessment of the possible trajectory for the current environment. Additional dropout layers switch off some neurons in the neural network randomly to reduce the possibility of overmatching.

A visualization of different properties of the environment capture is passed as an input into an autoencoder with a specified base structure. The environment is defined in a (6, 224, 224) tensor, which is defined as visualization of the environment as a 6 color channel image with a structure of resolution 224 pixels×224 pixels. The different color channels represent static structures, map information, dynamic structures, speeds, current right of way lanes, and traffic light phases.

The base structure of the convolution network is defined as RESNET-34 with an output vector of 2000 units. In addition, we add 96 units with additional information about the environment, such as speed limits, right of way rules, accurate distances, and lane association.

The trajectory is visualized as a two channel image. One channel visualizes map material and the other a possible trajectory. An autoencoder using Resnet-34 encodes the visualization as a 512 unit vector. Additionally, one-dimensional speed, acceleration, and orientation steps are added in a 72-unit vector.

The outputs of the autoencoders with information vectors, 2096 and 584 units, are output as a vector into a dense feed-forward network with a scalar output. The structure of this network is as follows.

TABLE 1

| Layer (type) | Output form | Parameter # |
| --- | --- | --- |
| Input | (2680, 1) | 0 |
| Dense 21 | (4096, 1) | 4096 * 2680 |
| Dropout | (4096, 1) | 0 |
| Dense 2 | (2048, 1) | 2048 * 4096 |
| Batch Normalization | (2048, 1) | 0 |
| Dense 3 | (1028, 1) | 1028 * 2048 |
| Dense 4 | (512, 1) | 512 * 1028 |
| Output | (1) | 512 |

Table 1 describes the feed-forward network behind the autoencoders. The input is a 2680 unit input vector.

What is claimed is:

1. A method for assessing possible trajectories of road users in a traffic environment comprising:
   capturing the traffic environment with static and dynamic features;
   identifying at least one first road user of the road users in the captured traffic environment;
   determining at least one possible trajectory for the identified at least one first road user of the road users in the captured traffic environment; and
   assessing the at least one determined possible trajectory for the identified at least one first road user of the road users based upon a behavior of a previously tracked at least one second road user of the road users in at least one previous traffic environment by using an adapted/trained recommendation service and the captured traffic environment.

2. The method according to claim 1, wherein:
   the adapted/trained recommendation service is configured to assess the at least one determined possible trajectory using a large number of corresponding combinations of assessed observed trajectories of the at least one second road user; and
   the at least one previous traffic environment comprises different traffic environments.

3. The method according to claim 2, wherein:
   the adapted/trained recommendation service is a collaborative recommendation service and has a neural network, and
   the neural network has a first autoencoder configured to capture the traffic environment and a second autoencoder configured to capture the at least one possible trajectory.

4. The method according to claim 2, wherein:
   the adapted/trained recommendation service is a collaborative recommendation service and is based on a K-nearest neighbor method, and
   vectors of the K-nearest neighbor method are formed according to the large number of corresponding combinations of the assessed observed trajectories, and the different traffic environments.

5. The method according to claim 1, wherein the adapted/trained recommendation service is a collaborative recommendation service and has a neural network with at least one convolution layer or a recursive neural network or is based on a K-nearest neighbor method.

6. The method according to claim 1, further comprising:
   determining the at least one possible trajectory using a geographical map of the traffic environment.

7. The method according to claim 1, wherein capturing the traffic environment further comprises:
   transforming spatial parts of the traffic environment into a two-dimensional reference system, corresponding to a plan view of the traffic environment.

8. The method according to claim 1, further comprising:
   determining the at least one possible trajectory according to an optimization of cost functions, a search-based method, and/or a machine-learning method.

9. A method for generating a recommendation service for assessing possible trajectories of a future road user in a future traffic environment based upon behavior of at least one tracked road user in at least one traffic environment, comprising:
   determining a large number of corresponding combinations of captured traffic environments including the at least one traffic environment, observed trajectories, and possible trajectories, by repeatedly
      capturing one of the traffic environments with at least one static feature and at least one dynamic feature,
      identifying at least one road user of the at least one tracked road user in a traffic situation in the captured one of the traffic environments,
      determining at least one possible trajectory for the identified at least one road user in the captured one of the captured traffic environments, and
      capturing an observed trajectory associated with the determined at least one possible trajectory for the identified at least one road user; and
   adapting the recommendation service based upon the large number of corresponding combinations of the captured traffic environments including the at least one traffic environment, the observed trajectories, and the possible trajectories, using a respective deviation of each of the captured observed trajectories from the associated determined at least one possible trajectory.

10. The method according to claim 9, wherein at least one of the respective deviations is calculated by using a metric.

11. A method for planning a first trajectory to be driven by a first road user of a first traffic environment, comprising:
   observing a plurality of second trajectories of a plurality of second road users in at least one second traffic environment including first static features;
   training a recommendation service with the observed plurality of second trajectories;
   capturing the first traffic environment, the first traffic environment including the first static features;
   identifying the first road user in the captured first traffic environment;
   identifying at least one third road user in the captured first traffic environment;
   determining at least one possible third trajectory for the at least one third road user in the captured first traffic environment;
   assessing the at least one determined possible third trajectory for the at least one third road user based upon the observed plurality of second trajectories by using the trained recommendation service and the captured first traffic environment; and determining the planned first trajectory to be driven by the first road user in the first traffic environment based upon the assessment of the at least one possible third trajectory of the at least one third road user.

12. The method according to claim 11, wherein an apparatus is set up to perform the method.

13. The method according to claim 11, wherein a computer program, comprising commands which, when a computer executes the program, causes the computer to perform the method.

14. The method according to claim 13, wherein the computer program is stored on a machine-readable storage medium.

15. The method according to claim 11, further comprising:
   adapting the trained recommendation service based upon an actual trajectory driven by the first user in the first environment after determining the first trajectory to be driven by the first road user in the first traffic environment.

16. The method according to claim 15, further comprising:
   calculating a difference between the actual trajectory and the determined first trajectory using a difference between an actual waypoint associated with the actual trajectory and a determined waypoint associated with the determined first trajectory.

\* \* \* \* \*